(12) United States Patent
Ma et al.

(10) Patent No.: US 12,416,555 B1
(45) Date of Patent: Sep. 16, 2025

(54) METHOD FOR DETERMINING LOAD-BEARING DEFORMATION OF SOLID WASTE MATERIALS AND SYSTEM AND DEVICE AND MEDIUM THEREOF

(71) Applicants: CHINA UNIVERSITY OF MINING AND TECHNOLOGY, Xuzhou (CN); XUZHOU XUGONG ENERGY EQUIPMENT CO., LTD, Xuzhou (CN)

(72) Inventors: Dan Ma, Xuzhou (CN); Meng Li, Xuzhou (CN); Qiang Li, Xuzhou (CN); Jixiong Zhang, Xuzhou (CN); Xuefeng Gao, Xuzhou (CN); Yong Liu, Xuzhou (CN); Wentao Hou, Xuzhou (CN); Xiaobao Luo, Xuzhou (CN); Jiguang Zhang, Xuzhou (CN); Qiang Cao, Xuzhou (CN)

(73) Assignees: CHINA UNIVERSITY OF MINING AND TECHNOLOGY, Xuzhou (CN); XUZHOU XUGONG ENERGY EQUIPMENT CO., LTD, Xuzhou (CN)

( * ) Notice: Subject to any disclaimer, the term of this patent is extended or adjusted under 35 U.S.C. 154(b) by 0 days.

(21) Appl. No.: 19/209,109

(22) Filed: May 15, 2025

(30) Foreign Application Priority Data

May 21, 2024 (CN) .......................... 202410627233.8

(51) Int. Cl.
*G01N 3/08* (2006.01)
*G01N 1/28* (2006.01)
(52) U.S. Cl.
CPC .............. *G01N 3/08* (2013.01); *G01N 1/286* (2013.01); *G01N 2203/0075* (2013.01)

(58) Field of Classification Search
CPC ... G01N 3/08; G01N 1/286; G01N 2203/0075
See application file for complete search history.

(56) References Cited

U.S. PATENT DOCUMENTS

2018/0037461 A1* 2/2018 Conner .................. C01B 32/20
2018/0327554 A1* 11/2018 Yoo ............................ A61P 9/06
(Continued)

FOREIGN PATENT DOCUMENTS

| CN | 113092261 A | 7/2021 |
|---|---|---|
| CN | 113504087 A | 10/2021 |

(Continued)

OTHER PUBLICATIONS

Yu Bang-Young et al., "Experimental Study of Compaction and fractural properties of grain size distribution of saturated crushed mudstone with different gradation" (submitted with IDS dated May 15, 2025).*

(Continued)

*Primary Examiner* — Alexander Satanovsky
(74) *Attorney, Agent, or Firm* — Piloff Passino & Cosenza LLP; Rachel Piloff; Sean Passino

(57) ABSTRACT

Disclosed a method, a system, a device, and a medium for determining load-bearing deformation of solid waste materials. The method includes: obtaining a bulk sample of solid waste material, sieving the sample to obtain multiple particle sizes, and measuring the mass of each particle size before the experiment; performing a compaction experiment on the bulk sample to obtain a stress-strain relationship curve, and calculating a slope of a linear part; sieving the bulk sample after the compaction experiment to obtain multiple particle sizes, and measuring a mass of each particle size; plotting a mass ratio diagram before and after the experiment, and calculating a relative breakage rate $B_r$ and a measured fractal dimension; constructing a macroscopic strain relationship equation, substituting the measured fractal dimension into (Continued)

the equation to obtain a macroscopic strain, and thereby determining load-bearing deformation degree of the solid waste materials.

5 Claims, 7 Drawing Sheets

(56) References Cited

U.S. PATENT DOCUMENTS

| | | | | |
|---|---|---|---|---|
| 2021/0116341 A1* | 4/2021 | Zhang | ............. | E21B 49/02 |
| 2022/0381744 A1* | 12/2022 | Gao | ............. | G01N 29/227 |
| 2023/0123404 A1* | 4/2023 | Kafentzis | ............. | D06M 15/19 |
| | | | | 428/116 |

FOREIGN PATENT DOCUMENTS

| | | | | | |
|---|---|---|---|---|---|
| CN | 113536594 A | | 10/2021 | | |
| CN | 116183448 A | | 5/2023 | | |
| JP | 2021087901 | * | 6/2021 | ............. | B01J 20/30 |
| JP | 2023134246 | * | 9/2023 | ............. | G01N 15/02 |

OTHER PUBLICATIONS

Krishna R. Reddy et al., "Geotechnical properties of synthetic municipal solid waste", International Journal of Geotechnical Engineering, J. Ross Publishing 3(3), 429-438, 2009.*

Notice of first Office action dated Jun. 24, 2024 in SIPO application No. 202410627233.8.

Retrieval report—First search dated Jun. 23, 2024 in SIPO application No. 202410627233.8.

Notification to Grant Patent Right for Invention dated Aug. 22, 2024 in SIPO application No. 202410627233.8.

Yu Bang-Yong; et al, Experimental study of compaction and fractal properties of grain sizedistribution of saturated crushed mudstone with different gradations, Rock and Soil Mechanics, Jul. 10, 2016, vol. 37, No. 7, pp. 1887-1894; doi: 10.16285/j.rsm.2016.07.008 (abstract translated) Full text, Issue 07, Claims involved: 1-9.

Meng Li, et al., Influence of particle size distribution on fractal characteristics of waste rock backfill materials under compression, Journal of Materials Research and Technology, Dec. 31, 2022, vol. 20, Sep.-Oct. 2022, pp. 2977-2989; doi: 10.1016/j.jmrt.2022.08.056 Full text, Claims involved: 1-9.

* cited by examiner

METHOD FOR DETERMINING LOAD-BEARING DEFORMATION OF SOLID WASTE MATERIALS AND SYSTEM AND DEVICE AND MEDIUM THEREOF

CROSS-REFERENCE TO RELATED APPLICATIONS

This application claims priority to Chinese Patent Application No. 202410627233.8, filed on May 21, 2024, the contents of which are hereby incorporated by reference.

TECHNICAL FIELD

The present disclosure relates to the technical field of backfill mining engineering, in particular to a method for determining load-bearing deformation of solid waste materials, a system, a device, and a medium thereof.

BACKGROUND

With the continuous development of the economy, mining operations are no longer solely focused on efficiency, as environmental protection post-mining has gradually gained attention. Coal mine backfill mining, as an important component of green mining, has experienced rapid development in recent years. Solid waste materials, such as gangue, are the main components of mine backfill materials, and research on the load-bearing deformation of solid waste materials is an important basis for the economic and environmental evaluation of backfill mining.

In the prior art, the primary method for measuring the load-bearing deformation of solid waste materials is macroscopic observation; the specific process includes: determining the observation targets and suitable observation points based on research objectives and tasks; installing corresponding observation equipment according to the requirements of the observation targets and points, and conducting regular observations and recordings at certain time intervals; organizing, analyzing, and processing the observed data to extract useful information and determine the deformation status and trends of the targets.

The defects of the above prior art are: the macroscopic observation method obtains overall data of solid waste materials but lacks detailed observation, ignoring the significant impact of post-crack fragmentation on the mechanical behavior of backfill materials, and resulting in inaccurate deformation results of solid waste materials.

SUMMARY

Based on this, it is necessary to address the above technical problems and provide a method for determining load-bearing deformation of solid waste materials, a system, a device, and a medium thereof.

The present disclosure provides a method for determining load-bearing deformation of solid waste materials, which includes following steps:

obtaining a bulk sample of solid waste materials, sieving the bulk sample to obtain multiple particle size samples, and measuring a mass of each of particle size samples before an experiment;

performing a compaction experiment on the bulk sample to obtain a stress-strain relationship curve of the bulk sample, and calculating a slope k of a linear part of the stress-strain relationship curve; sieving the bulk sample after the compaction experiment to obtain multiple particle size samples, and measuring a mass of each of particle size samples after the experiment;

plotting a mass ratio diagram of each of particle size samples before and after the experiment, and calculating the relative breakage rate $B_r$ and the measured fractal dimension of the bulk sample based on the mass ratio diagram; and constructing a macroscopic strain relationship equation based on the slope k of the linear part of the stress-strain relationship curve, the relative breakage rate Br, and the standardized equation of a fractal dimension D; substituting the measured fractal dimension of the bulk sample into the relationship equation to obtain the macroscopic strain of the solid waste material, and thereby determining load-bearing deformation degree of the solid waste material.

Additionally, the particle size of the bulk sample of the solid waste materials is 10-20 mm.

Additionally, a formula for calculating the slope k of the linear part of the stress-strain relationship curve is:

$$k = lg_{10}\left[\frac{M(d_i)}{M_T}\right] \Big/ lg_{10}\left[\frac{d_i}{d_{max}}\right];$$

where $d_i$ is a particle size, $M(d_i)$ is a mass of particles smaller than the particle size $d_i$, $M_T$ is a total mass of the sample, and $d_{max}$ is a maximum particle size.

Additionally, a formula for calculating the relative breakage rate $B_r$ of the bulk sample based on the mass ratio diagram is:

$$B_r = \frac{B_t}{B_p};$$

where $B_t$ is an area enclosed by an initial gradation curve, a post-breakage gradation curve, and a vertical line at a particle size of 0.074 mm; $B_p$ is an area enclosed by the initial gradation curve, the vertical line at a particle size of 0.074 mm, a horizontal line at 100% mass percentage, and a horizontal axis.

Additionally, a standardized equation for calculating a fractal dimension D of the bulk sample based on the mass ratio diagram is:

$$\begin{cases} D = 3 - k \\ k = lg_{10}\left[\frac{M(d_i)}{M_T}\right] \Big/ lg_{10}\left[\frac{d_i}{d_{max}}\right]; \end{cases}$$

where D is the fractal dimension, and k is the slope of the stress-strain relationship curve; $d_i$ is the particle size, $M(d_i)$ is the mass of particles smaller than particle size $d_i$, $M_T$ is the total mass of the sample, and $d_{max}$ is the maximum particle size.

Additionally, a formula for constructing the macroscopic strain relationship equation is:

$$\varepsilon = 0.02029\sigma^{58836} - 0.80807x^2 + 0.24292B_r + 0.5431n\,D - 0.37245;$$

where $\varepsilon$ is macroscopic strain, $\sigma$ is stress, x is porosity, $B_r$ is the relative breakage rate, and D is the fractal dimension.

Additionally, a system for implementing the method for determining load-bearing deformation of solid waste materials, which includes following modules:
- an acquisition module, configured to obtain the bulk sample of solid waste material, sieve the bulk sample to obtain multiple particle size samples, and measure the mass of each of particle size samples before the experiment;
- a calculation module, configured to perform the compaction experiment on the bulk sample to obtain the stress-strain relationship curve of the bulk sample, calculate the slope k of the linear part of the stress-strain relationship curve, sieve the bulk sample after the compaction experiment to obtain multiple particle size samples, and measure the mass of each of particle size samples after the experiment;
- a measurement module, configured to plot the mass ratio diagram of each of particle size samples before and after the experiment, and calculate the relative breakage rate $B_r$, and the measured fractal dimension of the bulk sample based on the mass ratio diagram; and
- a substitution module, configured to construct the macroscopic strain relationship equation based on the slope k of the linear part of the stress-strain relationship curve, the relative breakage rate $B_r$, and the standardized equation of the fractal dimension, substitute the measured fractal dimension of the bulk sample into the relationship equation to obtain the macroscopic strain of the solid waste material, and thereby determine the load-bearing deformation degree of solid waste material.

Additionally, a computer device with a memory storing a computer program and a processor, where the processor executes the computer program to implement the steps of the method for determining load-bearing deformation of solid waste materials.

Additionally, a storage medium with a computer program stored thereon, where the computer program, when executed by the processor, implements the steps of the method for determining load-bearing deformation of solid waste materials.

The method, system, device, and medium for determining load-bearing deformation of solid waste materials provided by the embodiments of the disclosure, compared with the prior art, have the following beneficial effects.

By performing a compaction experiment on the bulk sample of solid waste material to obtain the stress-strain relationship curve, calculating the slope k of the linear part of the stress-strain relationship curve, calculating the relative breakage rate $B_r$, and the measured fractal dimension of the bulk sample based on the mass ratio diagram of each of particle size samples before and after the compaction experiment, constructing a macroscopic strain relationship equation based on the slope k of the linear part of the stress-strain relationship curve, the relative breakage rate $B_r$, and the standardized equation of the fractal dimension, and substituting the measured fractal dimension into the relationship equation, the macroscopic strain of solid waste materials is obtained. The macroscopic observation method obtains overall data of solid waste materials but lacks detailed statistical analysis of the fine values during the load-bearing deformation process, ignoring the impact of cracks generated by deformed solid waste materials on the mechanical behavior of backfill materials, and resulting in inaccurate deformation results.

The disclosure simulates the deformation of solid waste materials through compaction experiments to obtain the stress-strain relationship curve, and replicating the impact of crack fragmentation on the mechanical behavior of backfill materials; the mass of the bulk sample before and after the compaction experiment is measured to plot the mass ratio diagram, thereby the relative breakage rate $B_r$, and the measured fractal dimension are calculated; then, based on the slope k of the linear part of the stress-strain relationship curve, the relative breakage rate Br, and the standardized equation of the fractal dimension, the macroscopic strain relationship equation is constructed, which solves the problem of the lack of detailed observation in macroscopic observation methods; by substituting the measured fractal dimension into the macroscopic strain relationship equation to obtain the macroscopic strain of the solid waste material, the load-bearing deformation degree of the solid waste material is determined, thereby improving the accuracy of the deformation determination results of solid waste materials.

DETAILED DESCRIPTION OF THE EMBODIMENTS

To make the objectives, technical schemes, and advantages of the disclosure clearer, the disclosure is further described in detail below with reference to the accompanying drawings and embodiments. It should be understood that the specific embodiments described herein are merely illustrative of the disclosure and are not intended to limit the disclosure.

Figure 1:
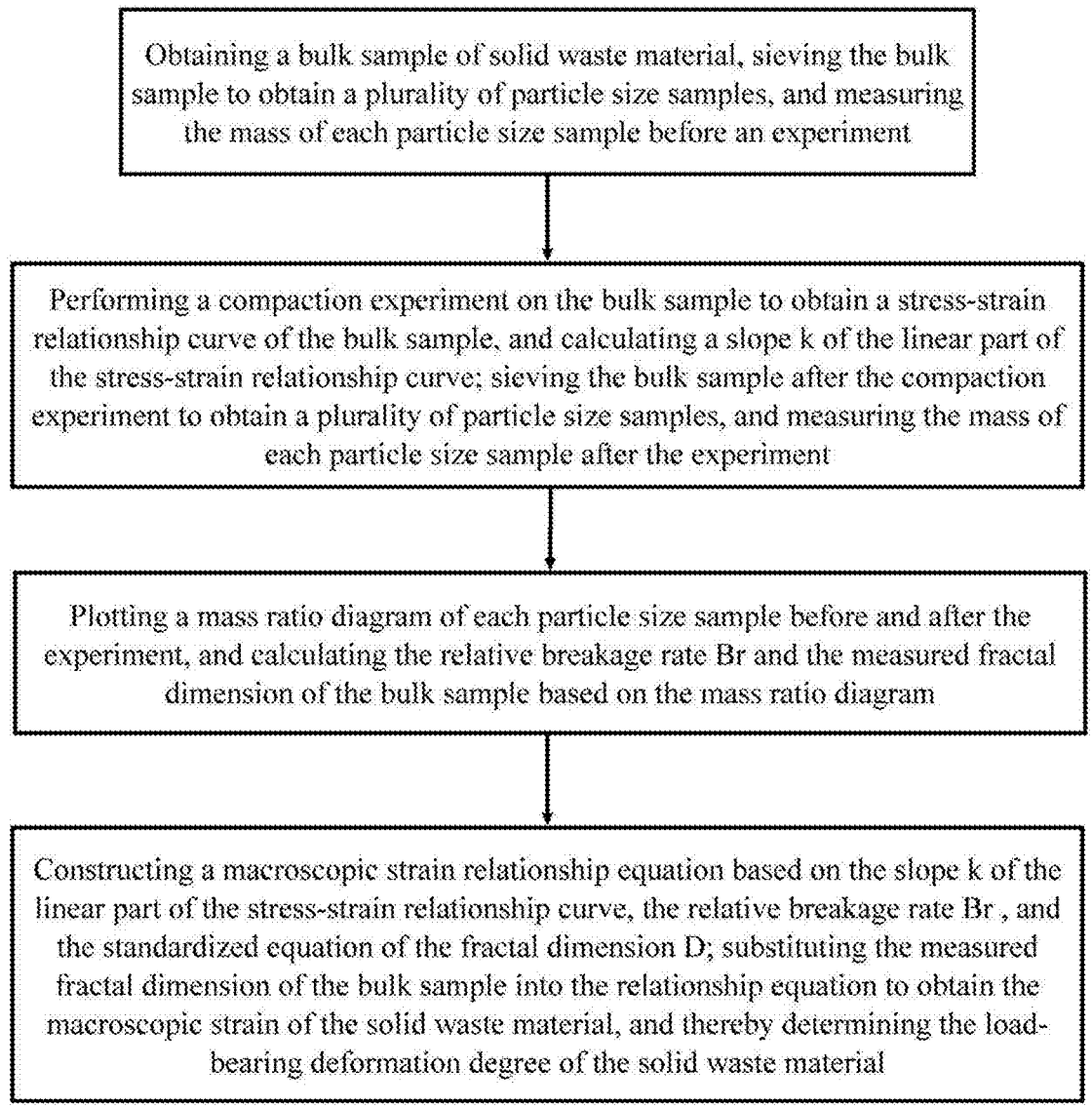
FIG. 1 shows a flowchart of a method for determining load-bearing deformation of solid waste materials provided in an embodiment.
Figure 2:
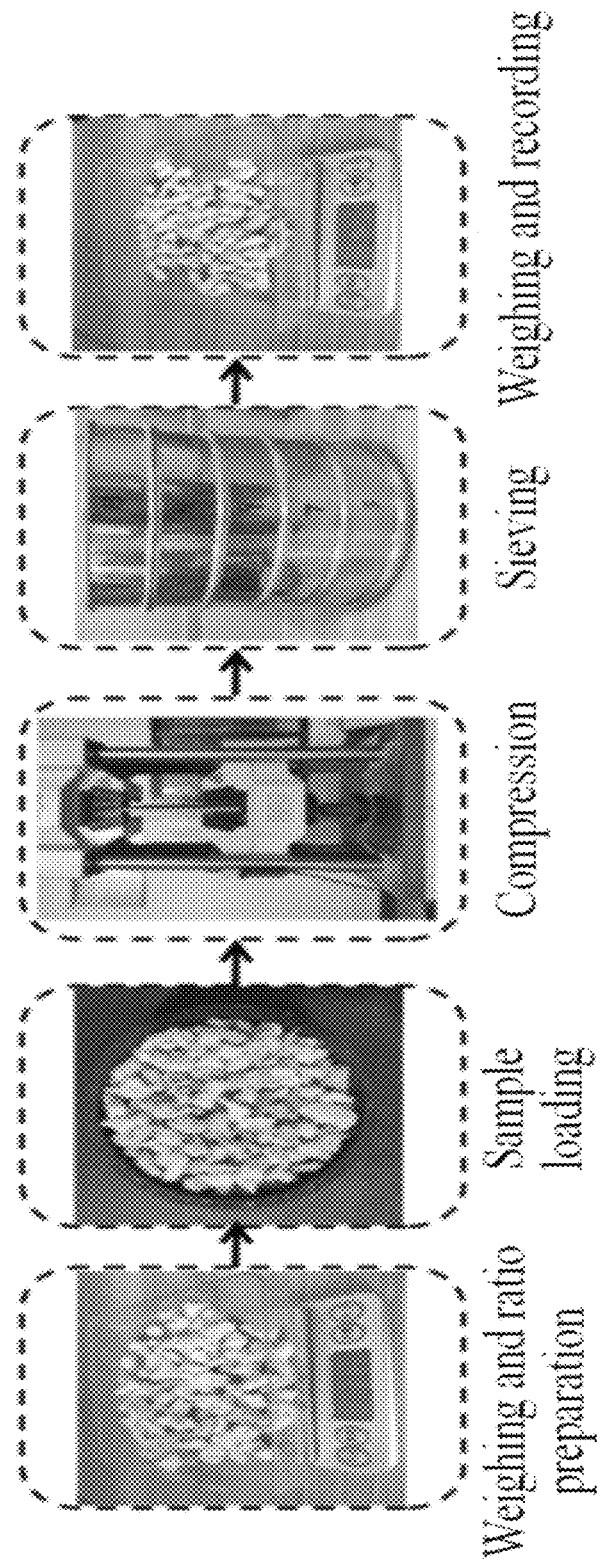
FIG. 2 shows a diagram of the compaction experiment process in a method for determining load-bearing deformation of solid waste materials provided in an embodiment.

In one embodiment, a method for determining load-bearing deformation of solid waste materials is provided, as shown in FIG. 1, which includes following steps:
- S1: obtaining a bulk sample of solid waste material, sieving the bulk sample to obtain multiple particle size samples, and measuring the mass of each of particle size samples before an experiment;
- S2: performing a compaction experiment on the bulk sample to obtain a stress-strain relationship curve of the bulk sample, and calculating a slope k of a linear part of the stress-strain relationship curve; and S3: sieving the bulk sample after the compaction experiment to obtain multiple particle size samples, and measuring a mass of each of particle size samples after the experiment; plotting a mass ratio diagram of each of particle size samples before and after the experiment, and calculating a relative breakage rate $B_r$ and a measured fractal dimension of the bulk sample based on the mass ratio diagram.

To quantitatively characterize the particle breakage degree of calcareous sand, the particle relative breakage rate theory proposed by Hardin is adopted, with the expression:

$$B_r = \frac{B_t}{B_p};$$

where $B_t$ is an area enclosed by an initial gradation curve, a post-breakage gradation curve, and a vertical line at a particle size of 0.074 mm; $B_p$ is an area enclosed by the initial gradation curve, the vertical line at a particle size of 0.074 mm, a horizontal line at 100% mass percentage, and a horizontal axis.

According to fractal geometry theory, S.W.TBrLER et al. established a standardized equation for calculating the fractal dimension of coarse-grained soil:

$$\frac{M(d_i)}{M_T} = \frac{P(d_i)}{100} = \left(\frac{d_i}{d_{max}}\right)^{3-D};$$

where $d_i$ is the particle size, $M(d_i)$ is a mass of particles smaller than particle size $d_i$, in kg; $M_T$ is a total mass of the sample, in kg; $P(d_i)$ is a mass percentage of particles smaller than the particle size $d_i$, in kg; $d_{max}$ is a maximum particle size; in mm; D is a fractal dimension.

Figure 3:
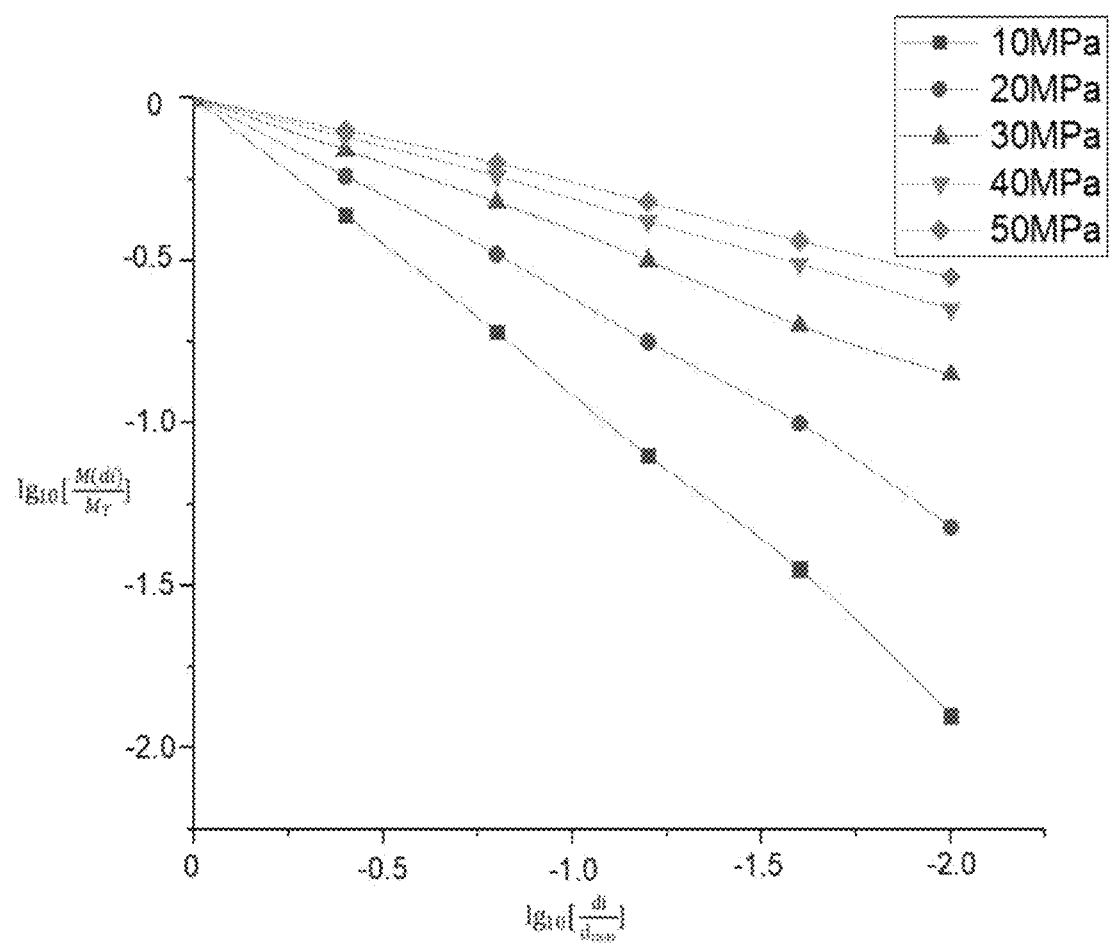
FIG. 3 shows a schematic diagram of the slope in a method for determining load-bearing deformation of solid waste materials provided in an embodiment.

Taking the logarithm of both sides of the above equation, and get:

$$D = 3 - lg_{10}\left[\frac{M(d_i)}{M_T}\right] \Big/ lg_{10}\left[\frac{d_i}{d_{max}}\right];$$

by fitting the equation, the linear part is represented by the slope k:

$$\begin{cases} D = 3 - k \\ k = lg_{10}\left[\frac{M(d_i)}{M_T}\right] \Big/ lg_{10}\left[\frac{d_i}{d_{max}}\right]; \end{cases}$$

where k refers to the slope of the approximate linear part of the plotted graph with $$lg_{10}\left[\frac{M(d_i)}{M_T}\right]$$

is the y-axis (dependent variable) and $$lg_{10}\left[\frac{d_i}{d_{max}}\right]$$

is the x-axis (independent variable), as shown in FIG. 3. Where D is the fractal dimension.

S4: constructing a macroscopic strain relationship equation based on the slope k of the linear part of the stress-strain relationship curve, the relative breakage rate $B_r$, and the standardized equation of the fractal dimension D; the formula for constructing the macroscopic strain relationship equation is:

$$\varepsilon = 0.02029\sigma^{058836} - 0.80807x^2 + 0.24292B_r + 0.5431n$$
$$D - 0.37245;$$

where $\varepsilon$ is the macroscopic strain, $\sigma$ is the stress, x is the porosity, $B_r$ is the relative breakage rate, and D is the fractal dimension.

S5: substituting the measured fractal dimension of the bulk sample into the relationship equation to obtain the macroscopic strain of the solid waste material, and thereby determining load-bearing deformation degree of the solid waste material.

In one embodiment, a system for determining load-bearing deformation of solid waste materials is provided, which includes the following modules:

an acquisition module, configured to obtain a bulk sample of solid waste material, sieve the bulk sample to obtain multiple particle size samples, and measure the mass of each of particle size samples before the experiment;

a calculation module, configured to perform a compaction experiment on the bulk sample to obtain a stress-strain relationship curve of the bulk sample, calculate the slope k of the linear part of the stress-strain relationship curve, sieve the bulk sample after the compaction experiment to obtain multiple particle size samples, and measure the mass of each of particle size samples after the experiment;

a measurement module, configured to plot a mass ratio diagram of each of particle size samples before and after the experiment, and calculate the relative breakage rate $B_r$ and the measured fractal dimension of the bulk sample based on the mass ratio diagram; and a substitution module, configured to construct a macroscopic strain relationship equation based on the slope k of the linear part of the stress-strain relationship curve, the relative breakage rate $B_r$, and the standardized equation of the fractal dimension, substitute the measured fractal dimension of the bulk sample into the relationship equation to obtain the macroscopic strain of the solid waste material, and thereby determine the load-bearing deformation degree of the solid waste material.

In one embodiment, a computer device is provided, the device includes a memory and a processor, where the memory stores a computer program, the processor executes the computer program to implement the steps of the method for determining load-bearing deformation of solid waste materials.

In one embodiment, a storage medium is provided, the storage medium stores a computer program, and when executed by a processor, the computer program implements the steps of the method for determining load-bearing deformation of solid waste materials as described above.

Embodiment 1

1. Preparing bulk samples with particle sizes of 10-20 mm. Ten groups of samples are prepared, with five sets of valid data to be collected.

2. Photographing the samples before the experiment, and sieving the samples before the experiment to measure the mass of each particle size.

Figure 4:
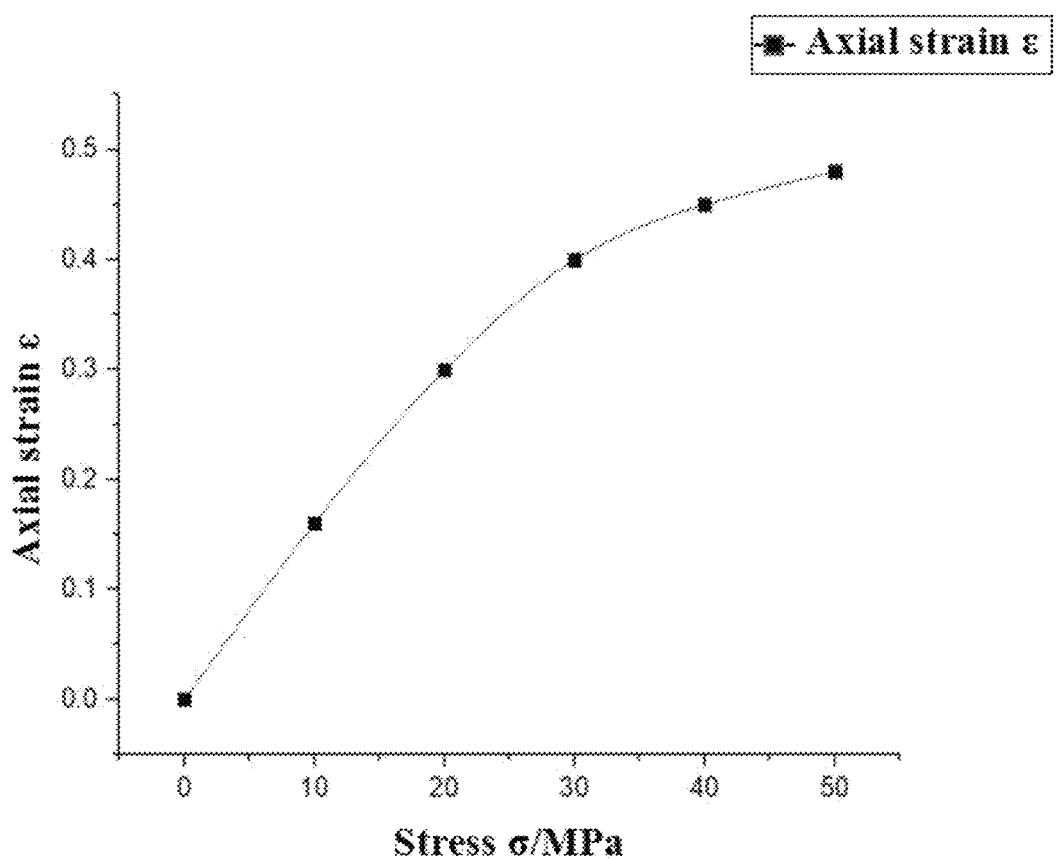
FIG. 4 shows a relationship curve diagram of the axial strain of the bulk sample and stress evolution in a method for determining load-bearing deformation of solid waste materials provided in an embodiment.

3. Placing the samples in the compaction apparatus for the experiment, measuring the complete stress-strain relationship curve of the bulk samples, extracting the bulk strain and stress, and plotting the graph, as shown in FIG. 4.

Figure 5:
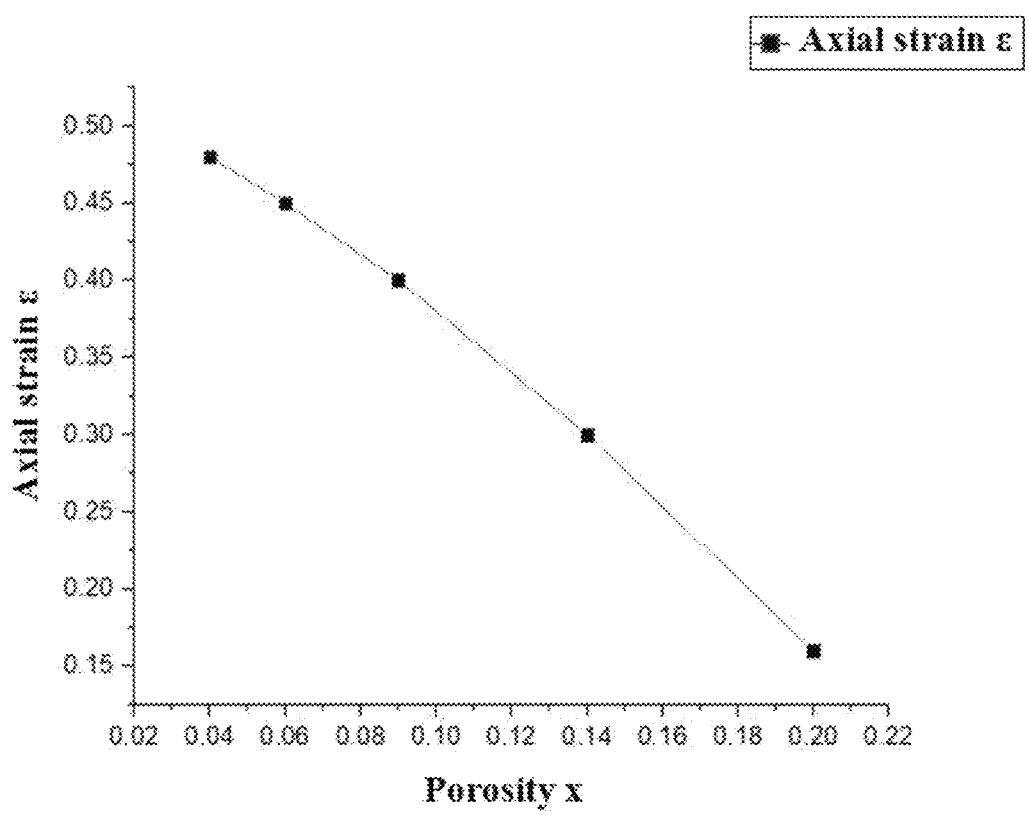
FIG. 5 shows a relationship curve diagram of the relative porosity and the axial strain of the bulk sample in a method for determining load-bearing deformation of solid waste materials provided in an embodiment.

4. Photographing the samples after the experiment, measuring the porosity using ImageJ software, and plotting the graph of the relationship between strain and porosity, as shown in FIG. 5.

Figure 6:
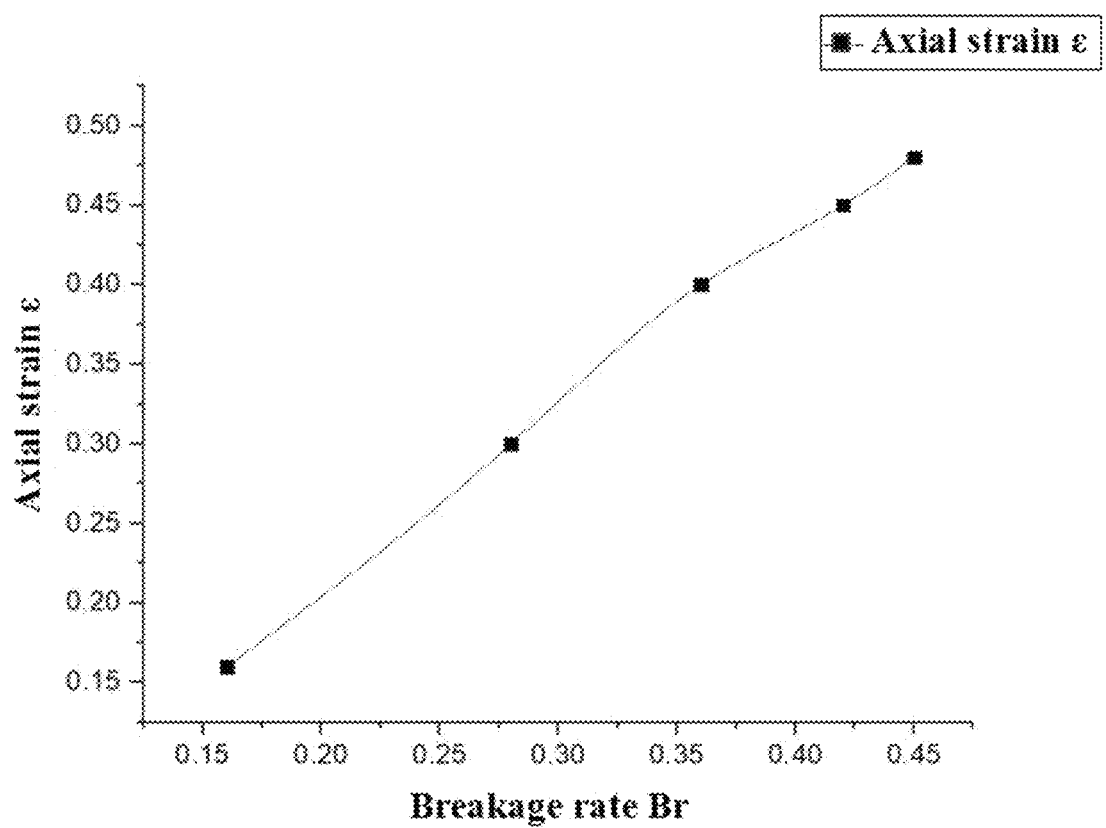
FIG. 6 shows a relationship curve diagram of the breakage rate and the axial strain of the bulk sample in a method for determining load-bearing deformation of solid waste materials provided in an embodiment.

Sieving the samples after the experiment again, measuring the mass of each particle size after the experiment, and plotting the particle size ratio diagram; calculating the relative breakage rate Br, and plotting the graph of the relationship between stress and breakage rate, as shown in FIG. 6.

Figure 7:
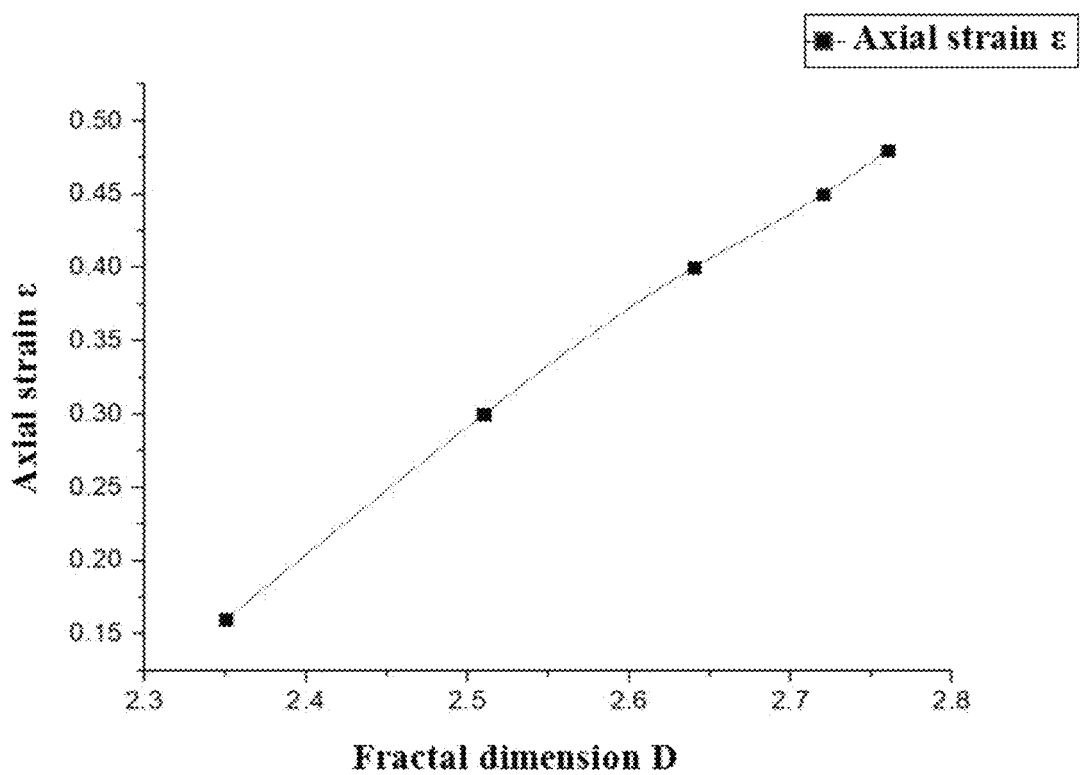
FIG. 7 shows a relationship curve diagram of the fractal dimension and the axial strain of the bulk sample in a method for determining load-bearing deformation of solid waste materials provided in an embodiment.

Calculating the fractal dimension under each stress using the fractal dimension calculation method described in S3, and plotting the graph of the relationship between stress and fractal dimension, as shown in FIG. 7.

5. Fitting the experimental data F, a, x, Br, and D into the equation to obtain the relationship between the breakage rate and fractal dimension induced by crack changes in the bulk sample and the macroscopic strain.

6. The experimental data values are shown in Table 1.

TABLE 1

| Stress σ/MPa | Porosity x | Relative Breakage Rate $B_r$ | Fractal Dimension D | Macroscopic Strain ε |
|---|---|---|---|---|
| 10 | 0.2 | 0.16 | 2.35 | 0.16 |
| 20 | 0.14 | 0.28 | 2.51 | 0.3 |
| 30 | 0.09 | 0.36 | 2.64 | 0.4 |
| 40 | 0.06 | 0.42 | 2.72 | 0.45 |
| 50 | 0.04 | 0.45 | 2.76 | 0.48 |

The above-described embodiments are merely illustrative of several implementations of the disclosure, and the descriptions thereof are specific and detailed, but they should not be construed as limiting the scope of the disclosure. It should be noted that for those skilled in the art, several modifications and improvements may be made without departing from the inventive concept, and these all fall within the protection scope of the disclosure. Therefore, the protection scope of the disclosure shall be subject to the appended claims.

What is claimed is:

1. A method for determining load-bearing deformation of solid waste materials comprises following steps:

obtaining a bulk sample of solid waste materials, sieving, by a sifter, the bulk sample to obtain a plurality of particle size samples, and measuring, by a weighing instrument, a mass of each of particle size samples before an experiment;

performing, by a compactor, a compaction experiment on the bulk sample to obtain a stress-strain relationship curve of the bulk sample, and calculating, by a computer, a slope k of a linear part of the stress-strain relationship curve;

wherein a formula for calculating the slope k of the linear part of the stress-strain relationship curve is:

$$k = lg_{10}\left[\frac{M(d_i)}{M_T}\right] \Big/ lg_{10}\left[\frac{d_i}{d_{max}}\right];$$

wherein $d_i$ is a particle size, $M(d_i)$ is a mass of particles smaller than the particle size $d_i$, MT is a total mass of the sample, and $d_{max}$ is a maximum particle size;

sieving, by the sifter, the bulk sample after the compaction experiment to obtain a plurality of particle size samples, and measuring, by the weighing instrument, a mass of each of particle size samples after the experiment;

plotting, by the computer, a mass ratio diagram of each of particle size samples before and after the experiment, and calculating, by the computer, a relative breakage rate $B_r$ and a measured fractal dimension of the bulk sample based on the mass ratio diagram;

wherein a standardized equation for calculating a fractal dimension D of the bulk sample based on the mass ratio diagram is:

$$\begin{cases} D = 3 - k \\ k = lg_{10}\left[\frac{M(d_i)}{M_T}\right] \Big/ lg_{10}\left[\frac{d_i}{d_{max}}\right] \end{cases};$$

wherein D is the fractal dimension, and k is the slope of the stress-strain relationship curve;

constructing, by the computer, a macroscopic strain relationship equation based on the slope k of the linear part of the stress-strain relationship curve, the relative breakage rate $B_r$, and the standardized equation of the fractal dimension D;

wherein a formula for constructing the macroscopic strain relationship equation is:

ε=0.02029σ$^{0.58836}$−0.80807x$^2$+0.24292$B_r$+0.5431n
D−0.37245;

wherein ε is macroscopic strain, σ is stress, x is porosity, $B_r$ is the relative breakage rate, and D is the fractal dimension; and substituting, by the computer, the measured fractal dimension of the bulk sample into the relationship equation to obtain the macroscopic strain of the solid waste materials, and thereby determining a load-bearing deformation degree of the solid waste materials;

when the macroscopic strain of the solid waste materials is bigger, determining that the load-bearing deformation degree of the solid waste materials is bigger;

when the macroscopic strain of the solid waste materials is smaller, determining that the load-bearing deformation degree of the solid waste materials is smaller.

2. The method for determining load-bearing deformation of solid waste materials according to claim 1, wherein the particle size of the bulk sample of the solid waste materials is 10-20 mm.

3. The method for determining load-bearing deformation of solid waste materials according to claim 1, wherein a formula for calculating the relative breakage rate $B_r$ of the bulk sample based on the mass ratio diagram is:

$$B_r = \frac{B_t}{B_p};$$

wherein $B_t$ is an area enclosed by an initial gradation curve, a post-breakage gradation curve, and a vertical line at a particle size of 0.074 mm; $B_p$ is an area enclosed by the initial gradation curve, the vertical line at a particle size of 0.074 mm, a horizontal line at 100% mass percentage, and a horizontal axis.

4. A computer device with a memory storing a computer program and a processor, wherein the processor executes the computer program to implement the steps of the method for determining load-bearing deformation of solid waste materials according to claim 1.

5. A storage medium with a computer program stored thereon, wherein the computer program, when executed by the processor, implements the steps of the method for determining load-bearing deformation of solid waste materials according to claim 1.

* * * * *